(No Model.)
E. C. PHILLIPS.
HORSE COLLAR.
No. 541,627.  Patented June 25, 1895.
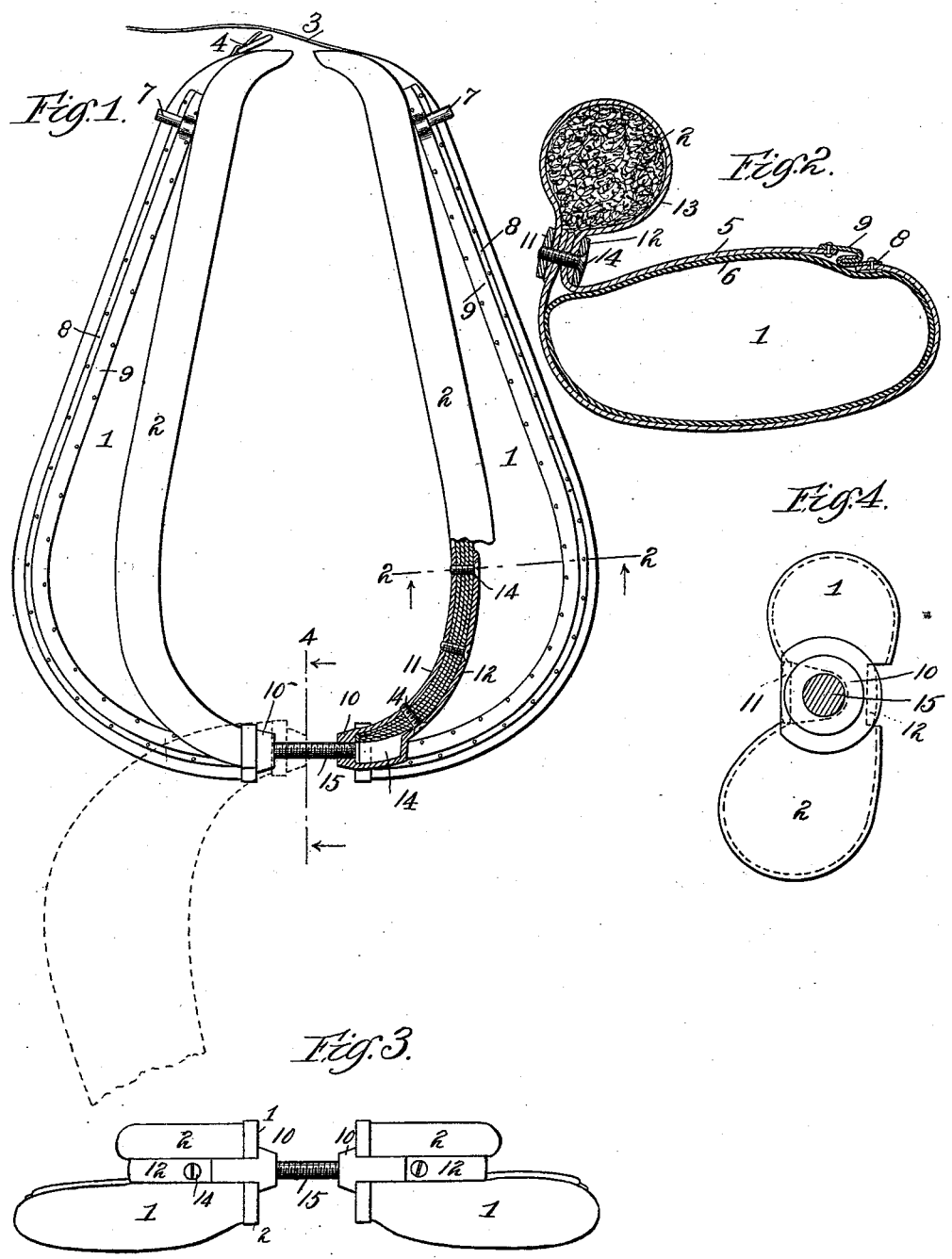

UNITED STATES PATENT OFFICE.

ELWOOD C. PHILLIPS, OF CHICAGO, ILLINOIS.

HORSE-COLLAR.

SPECIFICATION forming part of Letters Patent No. 541,627, dated June 25, 1895.

Application filed September 17, 1894. Serial No. 523,200. (No model.)

*To all whom it may concern:*

Be it known that I, ELWOOD C. PHILLIPS, a citizen of the United States, residing at Chicago, in the county of Cook and State of Illinois, have invented certain new and useful Improvements in Horse-Collars, of which the following is a specification, reference being had to the accompanying drawings, in which—

Figure 1 is a front elevation of a collar with part of one fore-wale cut away and partially in section. Fig. 2 is a cross-section on line 2—2 of Fig. 1. Fig. 3 is an end view of the collar viewed from below. Fig. 4 is a vertical cross section of the lower end upon line 4—4 of Fig. 1.

My invention relates to horse collars, and has for its objects to provide a new and improved means of fastening the outer covering upon the after-wale of what is known as a pneumatic horse-collar, and to provide means whereby the collar may be adjusted so as to be adapted to different sized necks of horses, whereby the collar may be readily and easily changed in size for the above purpose. I accomplish these objects as hereinafter specified and as illustrated in the drawings.

That which I regard as new will be set forth in the claims.

In the drawings, 1 indicates the after-wales and 2 the fore-wales of a horse collar.

3 indicates the collar strap, and 4 indicates a buckle upon the top of the collar, arranged in the usual manner.

5 indicates the covering of the after-wale, and 6 indicates a pneumatic tube formed of rubber or other suitable material, adapted to be inflated so as to fill the after-wale 1 of the collar. The pneumatic tube 6 is filled by means of valves 7 near its upper ends, which may be of any approved pattern.

8—9 indicate curved strips of brass or other suitable material, which are secured by being bolted, or in any other approved manner, to the free edges of the two pieces which form the covering 5 of the after-wale, as best shown in Fig. 2. The strips 8—9 are curved to conform in general to the shape of the after-wale, as best shown in Fig. 1, and have their free edges bent respectively upward and outward, and downward and inward, so as to engage with one another throughout their length, as best shown in Fig. 2.

The operation of this portion of the device is as follows: When it is desired to place the pneumatic tube 6 in the after-wale 1 of the collar, the interlocking strips 8—9 are freed from engagement with each other, the covering 5 is opened, and the pneumatic tube inserted. The upper portions of the strip 9 have a slight bend at their upper ends to permit of the passage under them of the valves 7. The strips 8—9 are then interlocked with each other, and the pneumatic tube inflated in the usual manner, until by the outward pressure of the air it causes the strips 8—9 to be firmly locked throughout their entire length. When it is desired to remove the pneumatic tube, the interlocking edges of the strips 8—9 are readily disengaged from each other, when the covering 5 may be opened and the pneumatic tube removed.

10—10 indicate nuts which are mounted at the lower end of the collar, one upon each side, and opposite one another. I prefer to mount these nuts in the manner shown in Figs. 1 and 3. To this end the nuts 10 are provided with rearward extending strips 11—12, which are so shaped as to grasp between them the ends of the covering 5 of the after-wale and the covering 13 of the fore-wale, between the fore-wale and the after-wale, as best shown in Figs. 1 and 2. They are then secured firmly upon the collar in that position by means of screws 14, as best shown in Figs. 1 and 2. The strips 11—12 may be formed integral with the nuts 10, or may be secured thereto in any appropriate manner. The lower portion of the strip 12 is bent so as to form a recess 14, (see Fig. 1,) within which may pass the ends of the screw 15 hereinafter described.

15 indicates a screw which is threaded to engage with the nuts 10. When it is desired to adjust the collar the strap 3 is unbuckled and the sides of the collar turned so as to either approach or recede from each other upon the screw 15, according to whether it is desired to make the collar larger or smaller. The dotted lines in Fig. 1 show one side of the collar turned downward and screwed in upon the screw 15 until it has reached the middle point of said screw.

That which I claim as my invention, and desire to secure by Letters Patent, is—

1. In a horse-collar, the combination with the covering of the after-wale, and an inflatable pneumatic tube adapted to be inclosed therein, of two metallic strips curved to conform to the shape of the after-wale and secured to the edges of the covering of said after-wale, said strips interlocking with each other along their free edges, whereby said covering is fastened together when said pneumatic tube is inflated, substantially as described.

2. In a horse-collar, the combination with the covering of the after-wale, and an inflatable pneumatic tube adapted to be inclosed therein and provided with a valve projecting through said covering, of two metallic strips curved to conform to the shape of the after-wale and secured to the edges of the covering of said after-wale, one of said strips being provided with a bend for the passage of the valve, said strips interlocking with each other along their free edges, whereby said covering is fastened together when said pneumatic tube is inflated, substantially as described.

3. In a horse-collar, the combination with the two sides thereof each comprising a fore and after-wale, of nuts provided with extensions that are clasped over the respective coverings of said wales between the latter, one extension of each nut being provided with a recess for the reception of a screw, and a screw engaging said nuts, whereby the sides of said collar may be adjusted, substantially as described.

ELWOOD C. PHILLIPS.

Witnesses:
C. E. PICKARD,
R. J. VAN DYKE.